(12) United States Patent
Rusu

(10) Patent No.: US 11,576,138 B2
(45) Date of Patent: Feb. 7, 2023

(54) METHOD AND AIR TRAFFIC CONTROL SYSTEM FOR SELECTING BEST RADIO SIGNAL

(71) Applicant: Rohde & Schwarz GmbH & Co. KG, Munich (DE)

(72) Inventor: Alexandru Rusu, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 203 days.

(21) Appl. No.: 17/012,452

(22) Filed: Sep. 4, 2020

(65) Prior Publication Data

US 2021/0204236 A1 Jul. 1, 2021

(30) Foreign Application Priority Data

Dec. 30, 2019 (EP) ..................................... 19220005

(51) Int. Cl.
*H04W 56/00* (2009.01)
*H04B 17/309* (2015.01)
*H04W 40/12* (2009.01)
*H04W 72/08* (2009.01)
(Continued)

(52) U.S. Cl.
CPC ........ *H04W 56/005* (2013.01); *H04B 17/309* (2015.01); *H04W 40/12* (2013.01); *H04W 40/20* (2013.01); *H04W 40/246* (2013.01); *H04W 56/008* (2013.01); *H04W 72/085* (2013.01)

(58) Field of Classification Search
CPC ... H04W 56/005; H04W 40/12; H04W 40/20; H04W 40/246; H04W 56/008; H04W 72/085; H04B 17/309; H04B 7/0828; H04B 7/082; H04B 17/318; G08G 5/0013; G08G 5/0026; G08G 5/00; G08G 5/0043
See application file for complete search history.

(56) References Cited

U.S. PATENT DOCUMENTS

| 6,516,192 B1 * | 2/2003 | Spaur | H04W 72/042 455/507 |
| 2009/0034788 A1 * | 2/2009 | Sim | G01D 4/008 382/100 |

(Continued)

FOREIGN PATENT DOCUMENTS

EP          0881783 A1     12/1998

*Primary Examiner* — Ashley Shivers
(74) *Attorney, Agent, or Firm* — Christensen O'Connor Johnson Kindness PLLC

(57) ABSTRACT

A method for selecting best radio signal in air traffic control includes: determining a respective latency of at least two receiving channels, wherein each receiving channel is provided between a corresponding receiver and a measurement and analysis module; measuring a respective arrival time of at least two radio signals received via the at least two receiving channels by the measurement and analysis module; determining the delay time between the at least two radio signals based on their arrival times; aligning the at least two radio signals with each other by taking the delay time determined into account, thereby obtaining at least two aligned signals; determining the quality of the at least two aligned signals; and switching to the receiving channel that processes the respective radio signal with the best quality determined. Further, an air traffic control system for selecting best radio signal is described.

15 Claims, 1 Drawing Sheet

(51) Int. Cl.
*H04W 40/20* (2009.01)
*H04W 40/24* (2009.01)

(56) References Cited

U.S. PATENT DOCUMENTS

| | | |
|---|---|---|
| 2011/0003570 A1* | 1/2011 | Yu ..................... H04N 21/4345 |
| | | 455/226.1 |
| 2013/0266323 A1 | 10/2013 | Tan |
| 2019/0041486 A1 | 2/2019 | Marinescu |
| 2020/0120573 A1* | 4/2020 | Gualtieri ............... H04W 88/08 |
| 2021/0176153 A1* | 6/2021 | Sardaryan ........... H04L 25/0212 |
| 2022/0046477 A1* | 2/2022 | Kusashima ............. H04L 69/08 |

* cited by examiner

METHOD AND AIR TRAFFIC CONTROL SYSTEM FOR SELECTING BEST RADIO SIGNAL

FIELD OF THE DISCLOSURE

The present disclosure relates to a method for selecting best radio signal in an air traffic control. Further, the present disclosure relates to an air traffic control system for selecting best radio signal.

BACKGROUND

Air traffic control systems are used for communication between air traffic controllers working at their respective workstations, also called controller working positions, and pilots in respective aircrafts. The air traffic controllers communicate with pilots by radio signals, for example amplitude-modulated signals, to transmit voice data. However, many radio signals are transmitted at the same time, yielding a mix of radio signals with different signal levels.

Further, modern air traffic control systems have several receivers for receiving and/or transmitting radio signals, wherein the several receivers are connected with a measurement and analysis module of the air traffic control system via respective receiving channels. The respective receivers, particularly their individual antennas, are typically distributed over a large area at different locations, resulting in different signals received by the respective receivers, particularly their antennas.

Usually, a so-called best signal selection (BSS) is used in order to identify the signal with the best signal quality such that this signal is forwarded to the air traffic controller.

Therefore, the signals received within a time span, namely a specific set timer or rather a time threshold, are taken into consideration of the best signal selection (BSS) algorithm in order to identify the signal having the best signal quality.

However, if the delay between two signals is too high, namely higher than the respective time threshold, the signal received via the receiving channel with a higher delay is not considered by the BSS algorithm. Accordingly, when working with high delays, it cannot be ensured that all receiving channels are taken into consideration.

As mentioned above, many aircrafts typically communicate with the air traffic control system simultaneously which further requires to separate the individual signals from respective sources from the set of mixed signals received. This separation further yields a delay in radio signal processing.

SUMMARY

Accordingly, there is a need for a method and an air traffic control system ensuring best radio signal selection.

The present disclosure provides examples of a method for selecting best radio signal in air traffic control. In an embodiment, the selection method comprises the following steps:

determining a respective latency of at least two receiving channels, wherein each receiving channel is provided between a corresponding receiver and a measurement and analysis module;

measuring a respective arrival time of at least two radio signals received via the at least two receiving channels by the measurement and analysis module;

determining the delay time between the at least two radio signals based on their arrival times;

aligning the at least two radio signals with each other by taking the delay time determined into account, thereby obtaining at least two aligned signals;

determining the quality of the at least two aligned signals; and switching to the receiving channel that processes the respective radio signal with the best quality determined.

Further, the present disclosure provides examples of an air traffic control system for selecting best radio signal. In an embodiment, the air traffic control system comprises at least two receivers, a measurement and analysis circuit or module, and a switching circuit or module. The respective receivers are connected with a measurement and analysis module via corresponding receiving channels. The measurement and analysis module is configured to determine a respective latency of the at least two receiving channels. Each of the receivers is configured to receive a respective radio signal. The receiver is configured to forward the respective radio signal received to the measurement and analysis module via the respective receiving channel processing the respective radio signal received. The measurement and analysis module is configured to measure the respective arrival time of these radio signals. The measurement and analysis module is configured to determine the delay time between these radio signals. The measurement and analysis module is configured to align these radio signals based on the delay time determined, thereby obtaining at least two aligned signals. The measurement and analysis module is configured to determine the quality of the at least two aligned signals. The measurement and analysis module is connected with the switching module. The measurement and analysis module is configured to forward the qualities determined to the switching module. The switching module is configured to switch to the respective receiving channel that processes the respective radio signal with the best quality determined.

The main idea is based on the finding that the best signal selection (BSS) can be improved by determining the respective latency of the receiving channels previously in order to take internal delays of the radio signal processing into account. Therefore, the respective latency of the receiving channels established between the individual receivers as well as the central measurement and analysis module are determined initially such that these latency values obtained can be used for improving the best signal selection algorithm.

Generally, the respective latency of the at least two receiving channels is used in order to set a time threshold of the measurement and analysis module. The time threshold of the measurement and analysis module determines the time span used for receiving individual radio signals received by the respective receivers. As the time threshold is adapted based on the respective latencies of the receiving channels determined previously, it is ensured that all radio signals received by all receiving channels are taken into consideration when determining the best quality of the radio signals received. In other words, no radio signal received is discarded even though the measurement and analysis module receives the respective radio signal later than its initial time threshold due to internal delays of the receiving channel. However, these internal delays (latency) are taken into consideration by adapting the time threshold such that the measurement and analysis module waits for all radio signals received by the different receiving channels.

In general, it is ensured that only the distance between the signal source, for instance the aircraft, and the respective receiver of the air traffic control system has an influence on the time of arrival, as internal delays assigned to the receiving channel are compensated by adapting the time threshold.

The respective arrival time relates to the time of arrival at the respective measurement and analysis module.

According to an aspect, the latencies of the at least two receiving channels are determined repetitively. Thus, changes of the respective quality of the receiving channels are taken into consideration such that a dynamic adaption due to changing latency values can be ensured.

Another aspect provides that a time threshold of the measurement and analysis module is adapted dynamically. Due to the repetitive determination of the latency values assigned to the receiving channels, the time threshold of the measurement and analysis module is adapted in a dynamic manner depending on the respective latency values measured or rather determined. Thus, changes in the receiving channel are taken into consideration ensuring that all radio signals received are forwarded to the measurement and analysis module within the dynamically adapted time threshold.

Another aspect provides that the time threshold of the measurement and analysis module is adapted based on the largest latency of the at least two receiving channels. Hence, the largest value of the latencies determined is used for adapting the time threshold in an appropriate manner. This ensures that all radio signals received via the individual receiving channels are taken into consideration when determining the radio signal with the best quality by the best signal selection algorithm.

Further, all radio signals received may be used for determining the radio signal having the best quality irrespective of their individual arrival times. This can be ensured due to the dynamic adaption of the time threshold of the measurement and analysis module. As mentioned above, the time threshold is adapted by the latencies determined, for example the largest latency determined. Thus, it is ensured that no radio signal received is forwarded to the signal and analysis module too late.

According to another aspect, switching to the receiving channel processing the radio signal with the best quality determined is done without any delay and/or interruption. All radio signals received are gathered by the measurement and analysis module such that switching between the different radio signals received may take place without any delay or rather interruption, as all signals are forwarded to the measurement and analysis module and aligned in time. Hence, all radio signals received are internally processed by the measurement and analysis module simultaneously.

Another aspect provides that, based on the radio signal received earliest, the delay time of the at least one other radio signal received is determined. The delay times of the individual radio signals received are determined based on the earliest received radio signal defining a starting time. Therefore, the respective delay times correspond to the differences of the times of arrival of the individual radio signals received by the measurement and analysis module with respect to the radio signal received earliest that defines the starting time.

Moreover, a delay according to the delay time determined may be introduced to the radio signal received earlier. Thus, the individual radio signals received are delayed by the measurement and analysis module so that the radio signals are aligned in time, yielding aligned radio signals. The aligned radio signals can be compared with each other in order to identify the radio signal having the best quality. The aligning does not only comprise delaying the individual radio signals received, but a dynamic correction of the individual radio signals received since the internal latencies assigned to the respective receiving channels are also considered.

According to an aspect, the same amount of data of each individual radio signal is taken into consideration when determining the quality of the at least two aligned signals. The alignment of the radio signals received, for example the delaying and the dynamic correction, ensures that the same amount of data can be used for comparing the individual radio signals received such that the best radio signal selection algorithm is improved appropriately.

The determination of the delay time may be based on an estimation. Thus, the respective delay time may be estimated rather than determined precisely. The estimation may be based on the latency value determined recently for the respective receiving channel. However, the latency value may be determined a few minutes ago such that the latency value used does not reflect the actual latency value. However, the latency value is updated on a regular basis such that the estimation is optimized.

As the latency value is updated on a regular basis, the threshold time of the measurement and analysis module is also updated on a regular basis, which ensures that all radio signals received are taken into consideration when determining the radio signal that has the best quality.

Another aspect provides that the respective radio signal processed by the receiving channel switched to is forwarded to at least one controller working position. Hence, the radio signal with the best quality determined is forwarded to the controller working position such that this radio signal is used by the air traffic controller.

The latency of the at least two receiving channels may be determined by transmitting a test signal from the measurement and analysis module to the respective receivers. Thus, a transmission test signal is used for determining the respective latency of the receiving channel. In some embodiments, the receiving channel corresponds to a bi-directional channel that can be used for receiving as well as transmitting radio signals.

For instance, the respective latencies are determined by transmitting the test signal from the measurement and analysis module towards the respective receivers. Then, a response signal is awaited wherein the time of arrival of the respective response signal is used to determine the latency of the respective receiving channel.

Generally, the radio signals processed by the air traffic control system correspond to digital signals rather than analogue signals.

In addition, the radio signal with best quality may relate to the radio signal that has the best voice quality, namely the best content quality. Determining the (voice) quality is generally known.

Generally, a blind signal separation or rather blind source separation may be applied in order to separate audio data of a certain source from a set of mixed radio signals received.

Accordingly, the method may comprise the additional step that a time threshold of the measurement and analysis module is set by using the respective latency of the at least two receiving channels. The time threshold of the measurement and analysis module determines the time span used for receiving individual radio signals received by respective receivers such that all radio signals received by all receiving channels are taken into consideration when determining the best quality of the radio signals received since the time threshold is adapted based on the respective latency of the receiving channels determined previously.

Hence, the measurement and analysis module may be configured to set a time threshold by using the respective latency of the at least two receiving channels, wherein the time threshold determines the time span used for receiving individual radio signals received by the respective receivers such that that all radio signals received by all receiving channels are taken into consideration when determining the best quality of the radio signals received since the time threshold is adapted based on the respective latency of the receiving channels determined previously.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
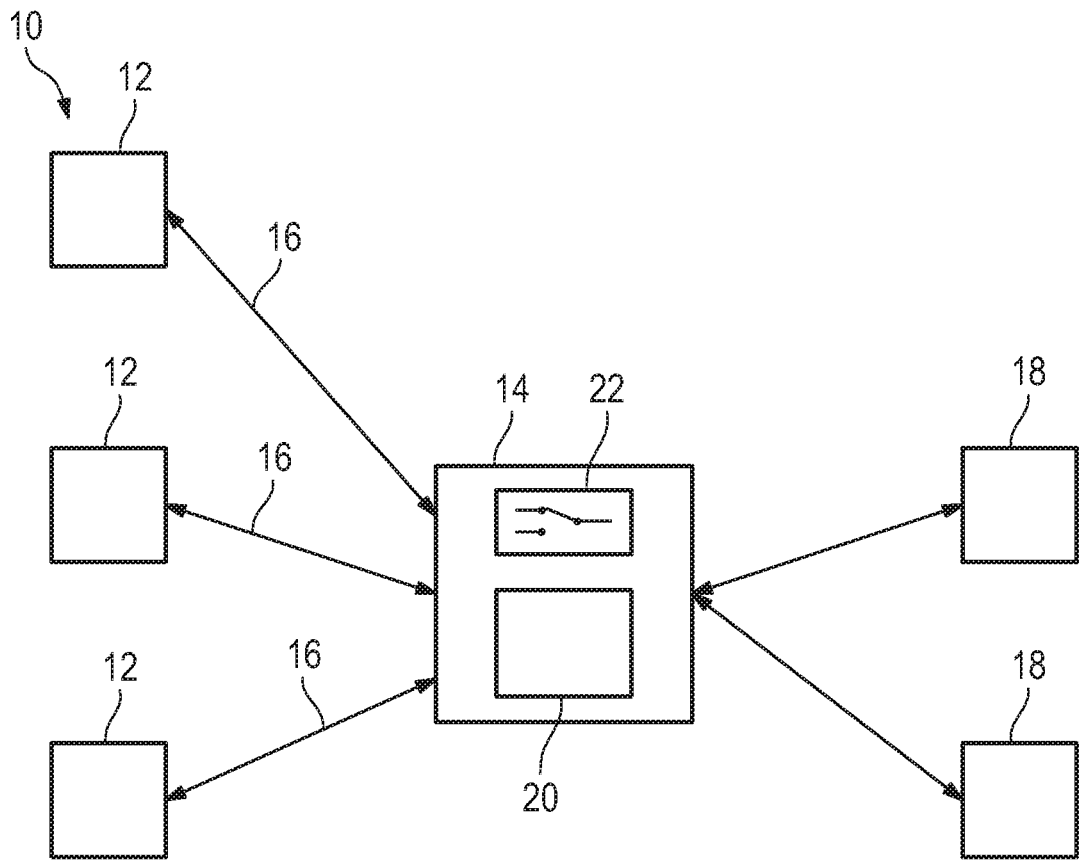
FIG. 1 shows a schematic overview of an air traffic control system according to an embodiment of the present disclosure, and FIG. 2 schematically shows a flow-chart representing a method for selecting best radio signal according to an embodiment of the present disclosure.

In FIG. 1, an air traffic control system 10 is shown that comprises three different receivers 12 and a central radio server 14 that is connected with the receivers 12 via respective receiving channels 16. Further, the air traffic control system 10 comprises two controller working positions 18 that are also connected with the radio server 14.

In the embodiment shown, the radio server 14 comprises a measurement and analysis circuit or module 20 as well as a switching circuit or module 22 that is interconnected between the receiving channels 16 and the controller working position 18.

In some embodiments, the air traffic control system 10 receives via their respective receivers 12 radio signals from different radio sources, for instance aircrafts. Thus, a set of mixed radio signals is received by each receiver 12 wherein the set of mixed signals originates from different sources as mentioned above. For separating the different radio sources, a blind signal separation or rather blind source separation may be applied in order to separate the audio data of the corresponding radio signals received.

Irrespective of the number of signal sources communicating with the air traffic control system 10, the receivers 12 each receive radio signals at different times due to their relative position and/or orientation with the respective signal source, namely the aircraft. In some embodiments, the different receiving times of the radio signals are based on the different distances between the respective receivers 12 and the signal source. In some embodiments, the receivers 12 are typically distributed over a wide area at different locations, resulting in different distances to a signal source and, thus, different receiving times.

Once the receivers 12 receive a respective radio signal, the receivers 12, with suitable circuitry, digitize the radio signals and forward the digitized radio signals to the radio server 14. In this embodiment, the radio server 14 is a completely digital radio server.

The radio server 14 receives the different radio signals from the receivers 12 at different times due to the different times of arrival at the receivers 12 mentioned previously. However, internal delays or rather latencies of the different receiving channels 16 also delay the radio signals received when forwarding these radio signals to the radio server 14.

However, the measurement and analysis module 20 has a time threshold that is used to collect radio signals within a certain time span. This means that radio signals received later than the time threshold are not taken into consideration by the measurement and analysis module 20 anymore, as these radio signals exceed the threshold time of the measurement and analysis module 20. Thus, it might happen that radio signals are not considered by the measurement and analysis module 20 due to internal delays of the receiving channels 16, for instance when determining the radio signal with the best quality that shall be forwarded to the controller working position(s) 18.

In order to overcome this issue, the air traffic control system 10 has previously determined respective latencies (internal delays) of the receiving channels 16. For this purpose, the measurement and analysis module 20 has transmitted a test signal to the respective receivers 12 via their corresponding receiving channels 16 in order to determine the latencies of these receiving channels 16. The latency values determined are then taken into consideration in order to adapt the time threshold of the measurement and analysis module 20. Thus, the time threshold is adapted based on the latency value(s) determined previously.

This ensures that all radio signals received by all receivers 12 are taken into consideration even though one of these radio signals is delayed within the respective receiving channel 16 by a time that would yield a time of arrival of the respective radio signal at the measurement and analysis module 20 later than the allowed time span set initially, namely the initial threshold time.

In other words, the respective radio signal forwarded to the measurement and analysis module 20 would exceed the time threshold of the measurement and analysis module 20 due to internal latencies of the receiving channel 16 if the time threshold was not adapted due to the latencies determined previously.

Since the time threshold of the measurement and analysis module 20 was adapted with respect to the latencies determined, all radio signals received are taken into consideration by the measurement and analysis module 20 when determining the radio signal having the best quality.

Typically, the latencies of the receiving channels 16 are determined in a repetitive manner such that the latency values are updated on a regular basis. This ensures that any deviations in the quality of the receiving channels 16 having an influence on the respective latency values do not affect the time threshold adaption, as the time threshold is also adapted in a regular manner Put differently, the time threshold of the measurement and analysis module 20 is adapted dynamically.

In general, the time threshold of the measurement and analysis module 20 is adapted based on the latencies of the receiving channels 16 in order to ensure that all radio signals received via the receivers 12 are used for determining the radio signal having the best quality irrespective of their individual arrival times at the measurement and analysis module 20.

Figure 2:
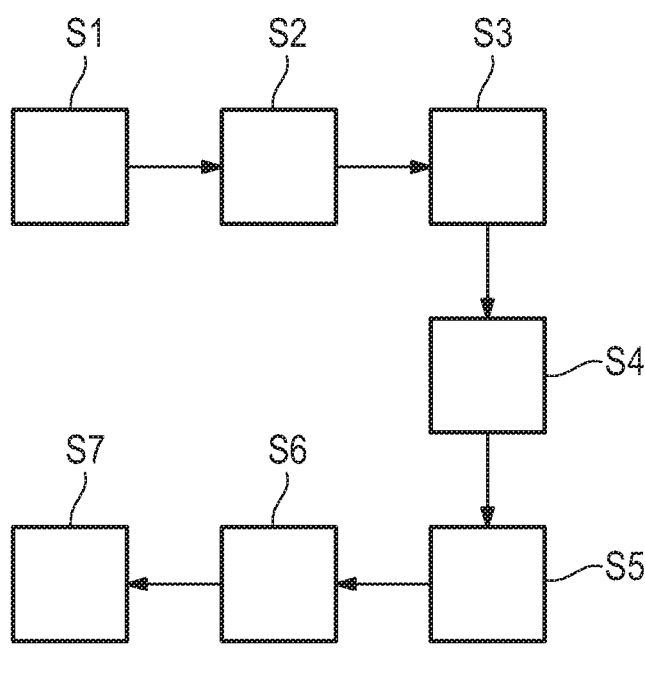

In some embodiments, the air traffic control system 10 is configured to perform a method for selecting best radio signal in air traffic control that is schematically shown in FIG. 2 in which a flow-chart of the method for selecting best radio signal in air traffic control is shown.

In a first step S1, respective latencies of the receiving channels 16 are determined, namely internal delays in signal processing.

In a second step S2, respective arrival times of the radio signals received via the receiving channels 16 are measured by the measurement and analysis module 20. In other words, the arrival times at the measurement and analysis module 20 are determined wherein the arrival times comprise internal delays of the receiving channels 16, namely the respective latencies.

In a third step S3, the delay time between the radio signals received are determined based on their respective arrival times measured previously.

In a fourth step S4, the radio signals are aligned with each other by taking the delay time determined into account, thereby obtaining at least two aligned signals. The radio signals received are aligned with each other by introducing a respective delay according to the delay time determined previously. Hence, the radio signals received earlier are delayed by a certain amount of time that corresponds to the respective delay time which was determined based on the radio signal received earliest, yielding a starting point for determining the respective delay times of the individual radio signals received.

In a fifth step S5, the aligned signals are further processed in order to determine the quality of these signals. When determining the quality of the aligned signals, the same amount of data of each individual radio signal is taken into consideration such that the best radio signal can be identified in an appropriate manner.

In a sixth step S6, it is switched to the receiving channel 16 that processes the respective radio signal with the best quality determined. This can be done without any delay and/or interruption, as the radio signals are processed simultaneously and corrected dynamically by the measurement and analysis module 20.

In a seventh step S7, the radio signal processed by the receiving channel 16 switched to is forwarded to at least one of the controller working positions 18. Hence, the radio signal identified as the radio signal with best quality is forwarded to the controller working position 18 such that the air traffic controller receives the radio signal having the best (voice) quality.

Accordingly, it is ensured that all radio signals received by the individual receivers 12 are taken into consideration when determining the radio signal that has the best (voice) quality. Thus, no radio signal received is discarded even though it might have a time of arrival at the measurement and analysis module 20 that would exceed the initial time threshold of the measurement and analysis module 20.

As the respective internal latencies or rather internal delays of the receiving channels 16 are determined, they can be used for dynamically correcting the respective times of arrival as well as adapting the time threshold of the measurement and analysis module 20 dynamically.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality of the server 14, including the measurement and analysis module 20 described herein, can be implemented by special purpose hardware-based computer systems or circuits, etc., or combinations of special purpose hardware and computer instructions. In other embodiments, instructions for carrying out the functionality of the server 14, including the measurement and analysis module 20, can be stored in any type of computer-readable medium or computer storage device and be stored on and executed by one or more general purpose computers, thus creating a special purpose computer configured to provide the functionality thereof.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for selecting best radio signal in air traffic control, comprising:
   determining a respective latency of at least two receiving channels, wherein each receiving channel is provided between a corresponding receiver and a measurement and analysis module;
   setting a time threshold of the measurement and analysis module by using the respective latency of the at least two receiving channels, wherein the time threshold of the measurement and analysis module determines the time span used for receiving individual radio signals received by respective receivers such that all radio signals received by all receiving channels are taken into consideration when determining the best quality of the radio signals received since the time threshold is adapted based on the respective latency of the receiving channels determined previously;
   measuring a respective arrival time of at least two radio signals received via the at least two receiving channels by the measurement and analysis module;
   determining the delay time between the at least two radio signals based on their arrival times;
   aligning the at least two radio signals with each other by taking the delay time determined into account, thereby obtaining at least two aligned signals;
   determining the quality of the at least two aligned signals; and
   switching to the receiving channel that processes the respective radio signal with the best quality determined.

2. The method according to claim 1, wherein the latencies of the at least two receiving channels are determined repetitively.

3. The method according to claim 1, wherein the time threshold of the measurement and analysis module is adapted dynamically.

4. The method according to claim 1, wherein the time threshold of the measurement and analysis module is adapted based on the largest latency of the at least two receiving channels.

5. The method according to claim 1, wherein all radio signals received are used for determining the radio signal having the best quality irrespective of their individual arrival times.

6. The method according to claim 1, wherein switching to the receiving channel processing the radio signal with the best quality determined is done without any delay and/or interruption.

7. The method according to claim 1, wherein, based on the radio signal received earliest, the delay time of the at least one other radio signal received is determined.

8. The method according to claim 1, wherein a delay according to the delay time determined is introduced to the radio signal received earlier.

9. The method according to claim 1, wherein the same amount of data of each individual radio signal is taken into consideration when determining the quality of the at least two aligned signals.

10. The method according to claim 1, wherein the determination of the delay time is based on an estimation.

11. The method according to claim 1, wherein the respective radio signal processed by the receiving channel switched to is forwarded to at least one controller working position.

12. The method according to claim 1, wherein the latencies of the at least two receiving channels are determined by transmitting a test signal from the measurement and analysis module to the respective receivers.

13. An air traffic control system for selecting best radio signal, comprising at least two receivers, a measurement and analysis circuit, and a switching circuit, wherein the respective receivers are connected with the measurement and analysis circuit via corresponding receiving channels and the measurement and analysis circuit is connected with the switching circuit,
   wherein the measurement and analysis circuit is configured to determine a respective latency of the at least two receiving channels;
   wherein the measurement and analysis circuit is capable of setting a time threshold by using the respective latency of the at least two receiving channels, wherein the time threshold determines the time span used for receiving individual radio signals received by the respective receivers such that all radio signals received by all receiving channels are taken into consideration when determining the best quality of the radio signals received since the time threshold is adapted based on the respective latency of the receiving channels determined previously;
   wherein each of the receivers is configured to receive a respective radio signal, and wherein the receiver is configured to forward the respective radio signal received to the measurement and analysis circuit via the respective receiving channel processing the respective radio signal received;
   wherein the measurement and analysis circuit is configured to:
      measure the respective arrival time of these radio signals;
      determine the delay time between these radio signals;
      align these radio signals based on the delay time determined, thereby obtaining at least two aligned signals;
      determine the quality of the at least two aligned signals; and
      forward the qualities determined to the switching circuit; and
   wherein the switching circuit is configured to switch to the respective receiving channel that processes the respective radio signal with the best quality determined.

14. The air traffic control system according to claim 13, wherein the measurement and analysis circuit is configured to transmit a test signal to the respective receivers in order to determine the latencies of the at least two receiving channels.

15. The air traffic control system according to claim 13, wherein the air traffic control system comprises at least one controller working position that is interconnected with the receivers via the switching circuit such that the controller working position receives the radio signal with the best quality determined.

* * * * *